(12) United States Patent
Kragh et al.

(10) Patent No.: US 7,821,221 B2
(45) Date of Patent: Oct. 26, 2010

(54) TWO-PHASE PERMANENT MAGNET MOTOR

(75) Inventors: Henrik Kragh, Skørping (DK); Bjarne Henriksen, Hedensted (DK)

(73) Assignee: Grundfos Management a/s, Bjerringbro (DK)

( * ) Notice: Subject to any disclaimer, the term of this patent is extended or adjusted under 35 U.S.C. 154(b) by 341 days.

(21) Appl. No.: 11/815,979

(22) PCT Filed: Jan. 24, 2006

(86) PCT No.: PCT/EP2006/000569

§ 371 (c)(1),
(2), (4) Date: Aug. 27, 2007

(87) PCT Pub. No.: WO2006/084566

PCT Pub. Date: Aug. 17, 2006

(65) Prior Publication Data

US 2008/0143284 A1   Jun. 19, 2008

(30) Foreign Application Priority Data

Feb. 11, 2005  (EP) .................................. 05002938

(51) Int. Cl.
*H02P 1/42*  (2006.01)

(52) U.S. Cl. ...................................... 318/774; 318/779

(58) Field of Classification Search ................... 318/74, 318/747, 774, 779, 746, 782
See application file for complete search history.

(56) References Cited

U.S. PATENT DOCUMENTS

| 4,409,526 | A |   | 10/1983 | Yamauchi et al. |
|-----------|---|---|---------|-----------------|
| 4,734,627 | A |   | 3/1988  | Koerner |
| 4,868,479 | A | * | 9/1989  | Byong-Ho et al. .......... 318/721 |
| 5,218,283 | A | * | 6/1993  | Wills et al. .................. 318/748 |
| 5,706,186 | A | * | 1/1998  | Blasko ........................ 363/41 |
| 5,747,958 | A | * | 5/1998  | Van Der Broeck et al. .. 318/747 |
| 5,952,798 | A |   | 9/1999  | Jones et al. |
| 6,465,973 | B1|   | 10/2002 | Kato et al. |
| 6,643,156 | B2| * | 11/2003 | Zubieta ....................... 363/132 |

FOREIGN PATENT DOCUMENTS

| DE | 3044062 A1     | 6/1981 |
| JP | 7046872 A      | 2/1995 |
| WO | 2004/008623 A1 | 1/2004 |

* cited by examiner

*Primary Examiner*—Rina I Duda
(74) *Attorney, Agent, or Firm*—Panitch Schwarze Belisario & Nadel LLP

(57) ABSTRACT

The invention relates to a two-phase permanent magnet motor which is controlled by a frequency converter. The frequency converter is advantageously provided with a three-phase inverter having six switches that are controlled in such a manner as to minimize switching losses.

19 Claims, 12 Drawing Sheets

Fig.2
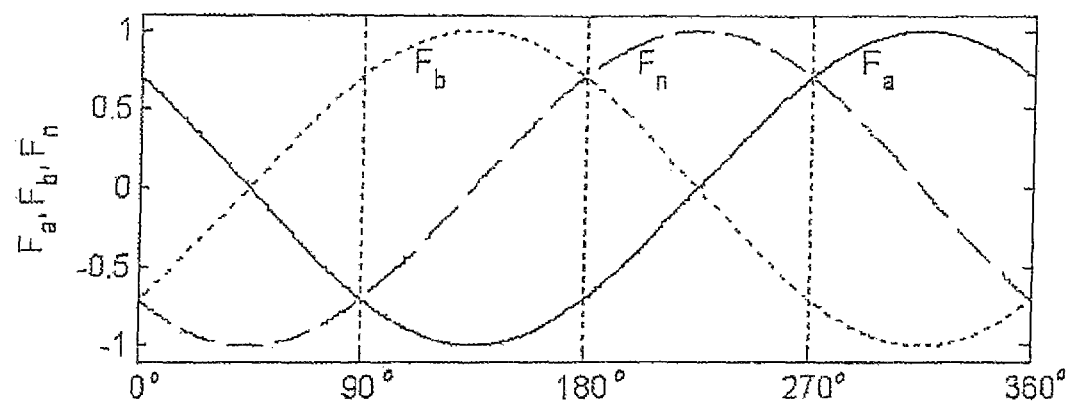
a
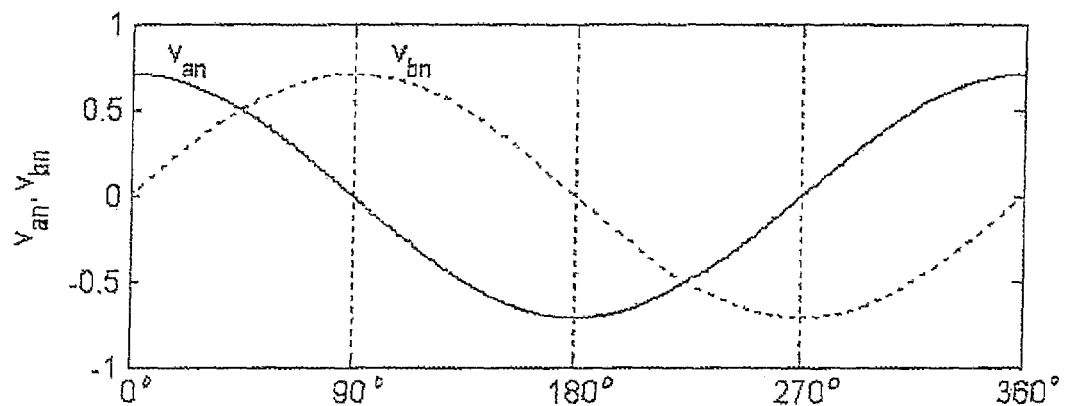
b
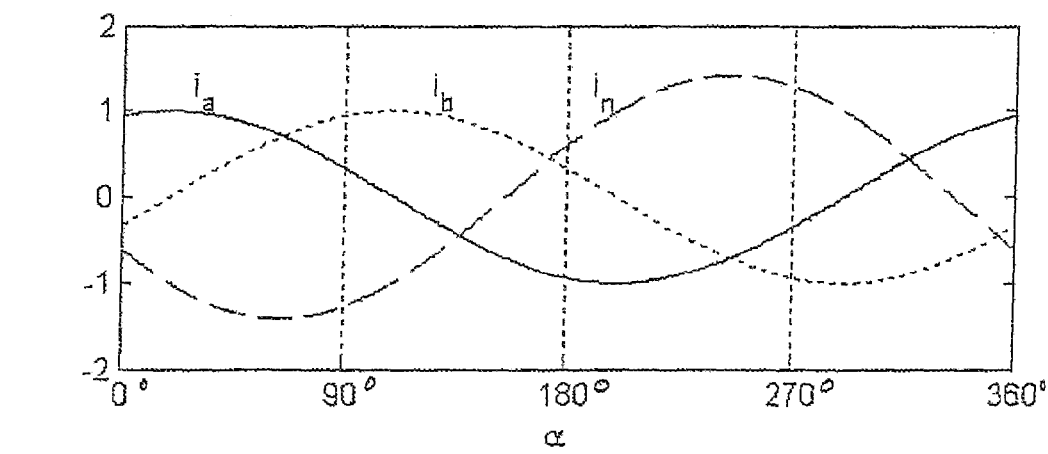
c

Fig. 4
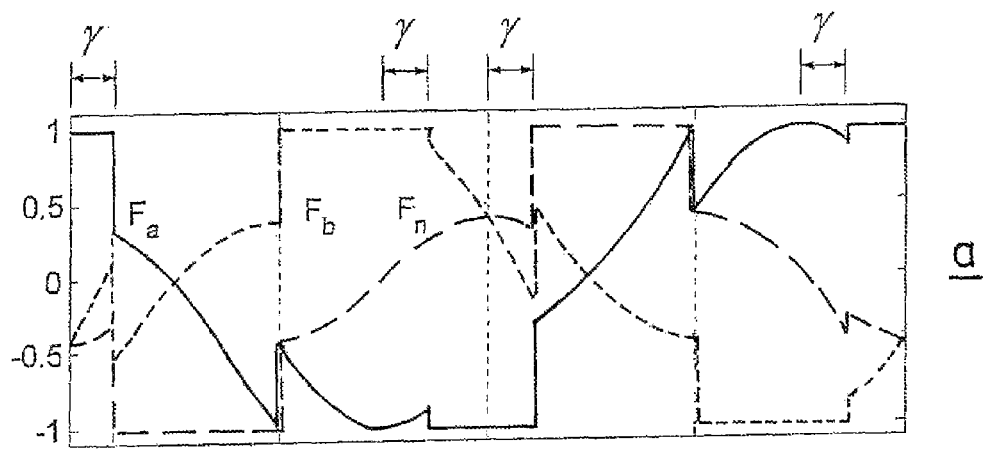
a
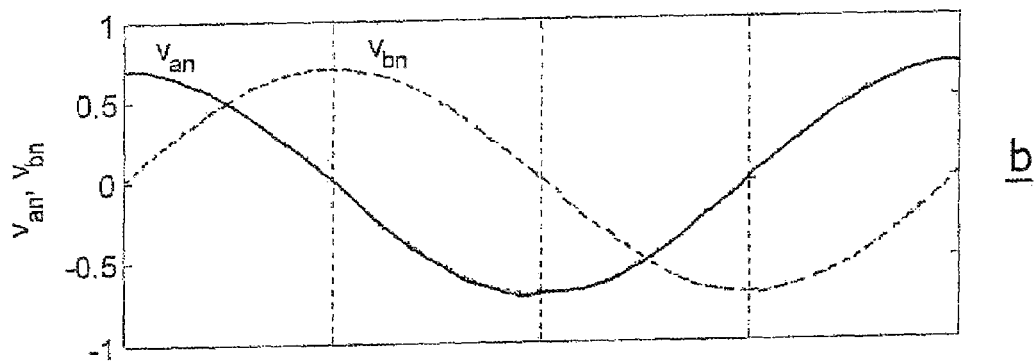
b
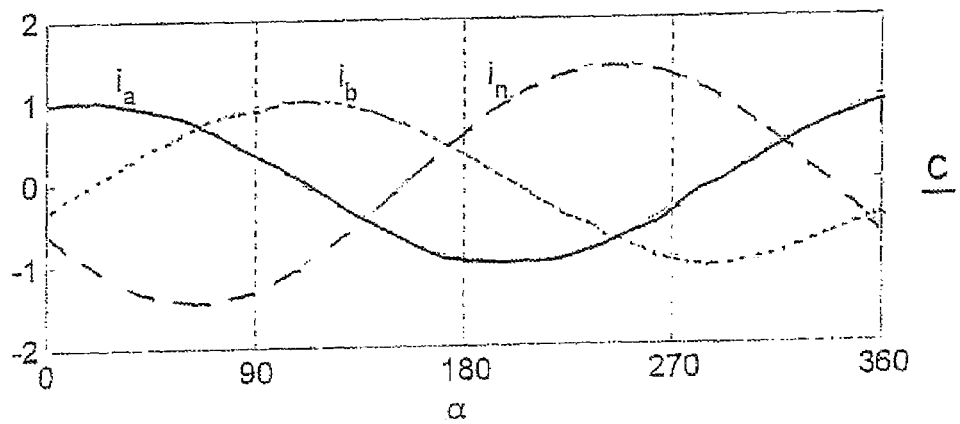
c

Fig.13
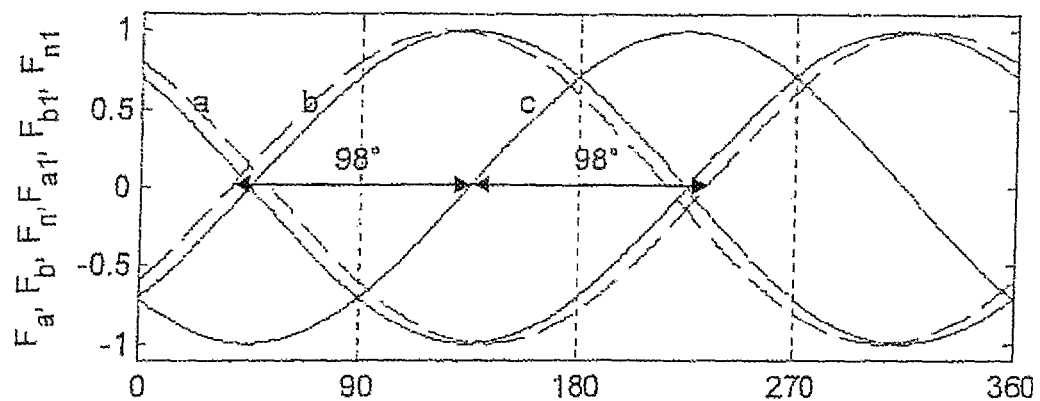
a
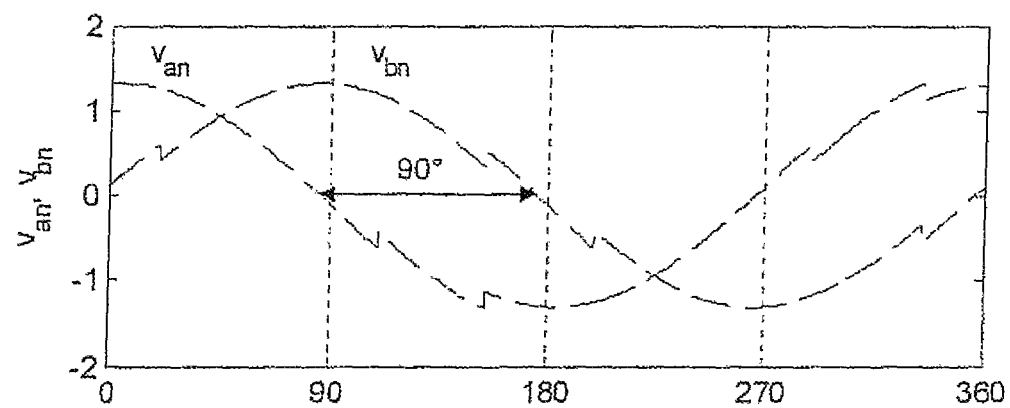
b
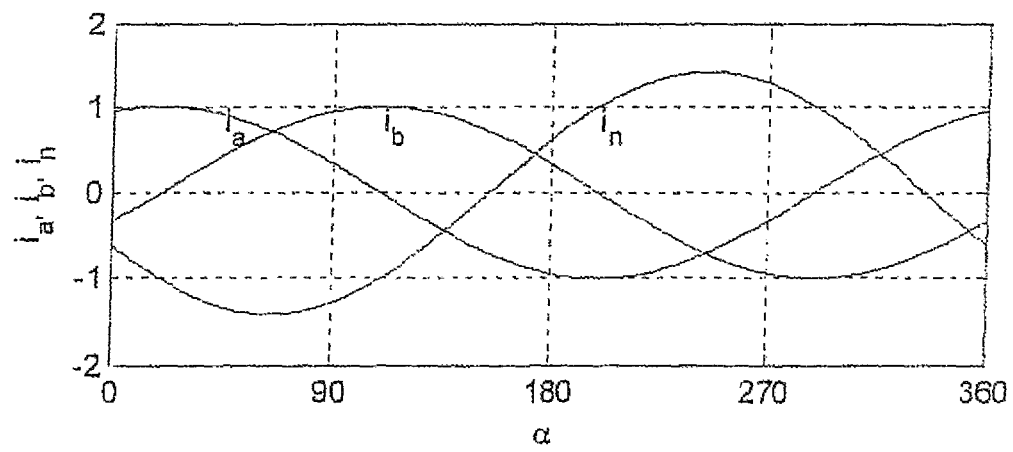
c

TWO-PHASE PERMANENT MAGNET MOTOR

CROSS-REFERENCE TO RELATED APPLICATIONS

This application is a Section 371 of International Application No. PCT/EP2006/000569, filed Jan. 24, 2006, which was published in the English language on Aug. 17, 2006, under International Publication No. WO 2006/084566, the disclosure of which is incorporated herein by reference.

BACKGROUND OF THE INVENTION

The invention relates to a two-phase permanent magnet motor, as well as to a method for activating a three-phase inverter for operation of such a two-phase permanent magnet motor, according to the features specified in the preamble of claim 6.

In particular for the drive of centrifugal pumps of smaller and medium power (e.g. 20 W to 100 W), as are typically applied in heating installations as circulation pumps, it is counted as belonging to the state of the art, to apply asynchronous motors as wet-running motors. In order to operate these in an effective manner, i.e. to be able to adapt them to the actual requirement of the installation, it is further known to activate these by way of a frequency converter, so that they may be operated in a stepless manner over a wide rage of rotational speeds. Permanent magnet motors are even more favorable in this range. It is counted as belonging to the state of the art, to feed these with an electronic speed controller, in order to be able to operate these with different rotational speeds. In order here to achieve a high efficiency, three-phase motors are regularly applied, which are also fed by a three-phase speed controller.

In order to achieve a high efficiency with such a three-phase motor, it is necessary to wind the phase winding tightly around the respective stator tooth. The three-phase construction is comparatively complicated, in particular with motors with a segmented stator.

Against this background, it is the object of the invention to design a two-phase permanent magnet motor, such that on the one hand it may be operated in an energetically favorable manner, and on the other hand may be manufactured inexpensively. Furthermore, a method for activating a three-phase inverter is to be designed, such that a two-phase permanent magnet motor may be operated in an energetically favorable manner, i.e. with a high efficiency, with this method.

The part of this object with regard to the device is achieved according to the invention by a two-phase permanent magnet motor with the features specified in claim 1. The part of the object with regard to the method is achieved by the features specified in claim 6. Advantageous designs of the invention are specified in the dependent claims, the subsequent description, as well as the drawing.

BRIEF SUMMARY OF THE INVENTION

According to the present invention, it is envisaged to activate a two-phase permanent magnet motor with a frequency converter. A compactly constructed motor with a high rotational speed variance is created by way of this, which in particular may be operated with a high efficiency on the basis of the method according to the invention, and is inexpensive in manufacture, in particular if, as will yet be specified further below, one may apply inexpensive frequency converters.

A motor is at its simplest with regard to the technical and electronic construction when the two motor phases are fed in parallel, and one phase is connected in series with a capacitor, in order to ensure the necessary phase shift. With such a simple design, one advantageously applies a single-phase inverter, so that with regard to the construction, a very simple motor with a very simple inverter may be applied. Such a design may also be manufactured in an inexpensive manner in large-scale manufacture.

However, at present a further formation according to the invention is even more favorable, which envisages activating a two-phase permanent magnet motor with a frequency converter, which comprises an inverter with a three-phase output. Such inverters are available in a particularly inexpensive manner, but in order to operate at a high efficiency, are to be activated with the method according to the invention, which is mentioned further below.

Thereby, one preferably uses an inverter which comprises six switches allocated in pairs, of which at least one pair is switched in a discontinuous manner.

In order in a simple manner, to create a phase shift between the two phases of a two-phase permanent magnet motor, it is advantageous to connect a capacitor in series with one phase, since then one no longer needs to provide a phase shift by way of the frequency converter, in a separate manner with regard to the control.

The method according to the invention serves for activating a three-phase inverter with six switches, which are connected in series in pairs, wherein the switch pairs are connected in parallel to the output of an intermediate circuit leading a constant voltage. Such inverters with six switches, as already specified above, are particularly inexpensively available on the market, and may therefore basically be advantageously used with a two-phase permanent magnet motor. However, a problem with this is the fact that switch losses which worsen the efficiency, occur with three-phase inverters with six switches on account of the significantly greater switching frequency compared to a single-phase inverter. It is indeed this which the method according to the invention avoids, with which in each case at least one winding end of a two-phase permanent magnet motor is connected between the switches of a switch pair, in a manner such that each winding is connected between two different switch pairs, and with which the activation of the switches is effected such that the windings are subjected to alternating voltages which are phase-shifted to one another, by way of the fact that one switch of a switch pair is held closed over a rotational angle of at least 10°, preferably between 35° and 100°, and the other is opened, whilst the desired voltage course at the windings is produced by way of modulating the two other switch pairs. By way of the fact that one switch of a switch pair according to the invention remains closed over a rotation angle of at least 10°, typically however between 35° and 100°, one saves a multitude of switching procedures, specifically those, were this switch likewise to be switched in a modulated manner, and thus also the switching losses which would occur with this.

"Modulated switching" in the context of the present invention is to be understood as switching procedures, which are effected at a high frequency, typically for example 18 kHz, in order to produce the, for example, sinusoidal alternating voltage by way of pulse-width modulation, to which the motor is subjected.

Although it is counted as belonging to the state of the art, with pulse-width modulation, to keep one switch closed e.g. for several switching periods by way of overmodulation, this however is never effected over such a large rotation angle of at least 10°. The overmodulation furthermore has the grave disadvantage on application of a motor for a heating circulation pump, that significant noise developments may occur on account of the irregular development of moments, which is indeed what the present invention wishes to avoid. The method according to the invention is therefore advantageously applied such that the windings are subjected to essentially sinusoidal alternating voltages phase-shifted by 90°, indeed precisely to avoid the noise emission which occurs on subjecting the windings in a non-sinusoidal manner.

In a further formation of the method according to the invention, the rotation angle during which the switch is kept closed, is predefined, and is dependent on the current angle of the supply voltage of the stator. Predefined in the context of the invention is to be understood in that the activation method is stored in the microprocessor in dependence on the geometric relationships, and is only dependent on the supply voltage of the stator, or the position of the rotor which results therefrom.

According to the invention, it is always that switch which is kept closed over a larger rotation angle, which leads a set value potential (corresponding to FIG. 2a with an idealized sinusoidal potential curse) which lies closest to one of the two intermediate circuit potentials prevailing at the output of the intermediate circuit. Then, specifically, the other two switch pairs may be activated in a modulating manner, in order to produce the desired sinusoidal alternating voltage without particularly high switch currents arising there. Set value potentials in the context of the invention are to be understood as the voltage set values which are stored in the microprocessor of the frequency converter as an actual value setting for the mean value course of the voltages at the outputs (phases).

Basically, the method according to the invention may be applied over the complete rotational speed range of the motor. However, in particular when the inverter may be controlled for producing alternating voltages of a lower and higher voltage and/or frequency, it may however advantageously be the case, that a switch is kept closed over a large rotational angle of at least 10° only on producing alternating voltages of a high voltage, and, when the inverter operates for producing alternating voltages of lower voltages, it is activated in a continuous manner known per se. Since with a high voltage, as a rule larger currents flow than with a lower voltage, the switching losses here are also particularly high, which is why it is in particular advantageous in this region to keep a switch closed over a larger rotation angle.

Since the switching loses at the switch with modulating operation are at their greatest when the largest current flows, according to a further formation of the invention, one envisages constantly keeping that switch closed, through which the greatest current flows, whilst taking into account that this, with regard to potential, lies closest to one of the intermediate circuit potentials, and switching the remaining switches in a modulating manner.

The longer a switch may remain closed, the lower are the switching loses occurring there. According to the invention, it is particularly advantageous if a switch is kept closed over a rotation angle of about 90°, thus a quarter rotation of the motor.

Since the inverter has a three-phase exit, but the two-phase permanent magnet motor only has two phase windings, in each case one winding end is present at two phase outputs of the inverter, wherein the winding ends of both windings are connected to the third phase output. Thereby, it is advantageous to keep a switch of the switch pair at which the winding ends of both windings are connected, firstly closed over a rotation angle of 90°, then to switch it in a modulating manner over a rotation angle of about 90°, whereupon then the other switch of this switch pair is kept closed over about 90° and subsequently is switched in a modulating manner over about 90°, whereupon a motor rotation is effected, and the procedure may be repeated in a periodic manner. Such an activation is particularly favorable, since a comparatively large current always flows through the switches to which both winding ends are connected, so that the switching losses may be kept particularly low by way of this method.

In a further formation of this method, advantageously one switch of the two other switch pairs may be kept closed in the 90°-intervals in which no switch of the switch pair between which the winding ends of both windings are connected, are kept closed over a rotation angle of more than 10°, and specifically such that during the first 90°-interval, one switch of the one switch pair and during the next 90°-interval one switch of the other switch pair is kept closed. With this method, one switch is practically constantly kept closed, by which means the switch losses may be kept low.

Alternatively, in each case one switch of the other switch pairs may be kept closed in the 90°-intervals, in which no switch of the switch pair between which the winding ends of both windings are connected, is kept closed, and specifically for the first 45° of the interval, one switch of the one switch pair, and for the second 45° of the interval, one switch of the other switch pair.

It may also be advantageous during a 360°-rotation to only keep those switches closed, which create the lead connection to only one of the two intermediate circuit potentials. This is particularly useful if a reduction of the noise and a reduction in switching losses are to be achieved.

According to a further formation of the invention, advantageously during a 360°-rotation, one may keep switches closed, such that one lead connection to one and subsequently to the other of the two intermediate circuit potentials is created in an alternating manner over a rotation angle of about 180°. In this case, only two switch pairs are activated in a discontinuous manner. The switching frequency may also be reduced by way of this.

It may be advantageous to replace the discontinuous switch activation for a certain angle, thus typically keeping closed a switch over a rotation angle of more than 10°, with a continuous (modulating) switch activation shortly before the potential change. This is effected preferably 1 to 15 switching periods before the potential change, with respect to the switch periods with normal modulating operation. A further reduction in the noise may be achieved by way of this.

A particularly smooth running of the motor is achieved if the currents of the two motor phases run offset to one another by a predefined angle. It is therefore useful to design the control, such that such a phase-shifted current course is achieved. The angle of the phases to one another should preferably be adapted to the geometric angle of the phases of the motor.

In order to achieve the latter, it is advantageous to fix the phase angle between the set value potentials of the common phase and the other phases by a value deviating from 90°, preferably a larger value. Thereby, it has been found that a deviation of the phase angle between 3° and 15° usually leads to particularly good results with regard to the desired current course.

According to a further formation of the invention, it is envisaged for the switch which connects both motor windings over a rotation angle of 10° to 100° to one of the two intermediate circuit potentials, to be closed by an angle Y later than the switch which connects only one motor winding to an intermediate circuit potential over a rotational angle of 10° to 100°, and for the switches which only connects one winding to an intermediate circuit potential over a rotation angle of 10° to 100°, to be opened later accordingly by an angle Y. This angle Y is advantageously selected such that it corresponds to the angle of the phase shift between the voltage and current in a motor winding.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2a shows the normalized set value potentials of a conventionally activated, three-phase inverter for operation of a two-phase permanent magnet motor, over one motor rotation;

FIG. 2b shows the normalized voltages at the windings of a two-phase permanent magnet motor which results therefrom;

FIG. 2c shows the normalized currents in the phases of the inverter which result therefrom;

FIGS. 3a and aa show two different set value potentials at the three-phase exit of an inverter, in the representation according to FIG. 2a;

FIG. 3b shows the normalized voltages at the two windings of a two-phase permanent magnet motor, resulting therefrom;

FIG. 3c shows the currents which arise in the individual phases of the inverter, in a normalized representation;

FIG. 4a to 11a show alternative set value potentials at the output of a three-phase inverter, in the representation according to FIG. 2a;

FIG. 4b to 11b show the voltages prevailing thereby at the two windings of a two-phase permanent magnet motor;

FIG. 4 to 7c show the currents which then result in the phases of the inverter;

FIG. 13a shows set value potentials at the three-phase output of the inverter and the potentials which actually result, with an improved activation method;

FIG. 13b shows the voltages which the actually set in at the windings of the two-phase permanent magnet motor; and FIG. 13c shows the currents which then indeed set in.

DETAILED DESCRIPTION OF THE INVENTION

Figure 1A:
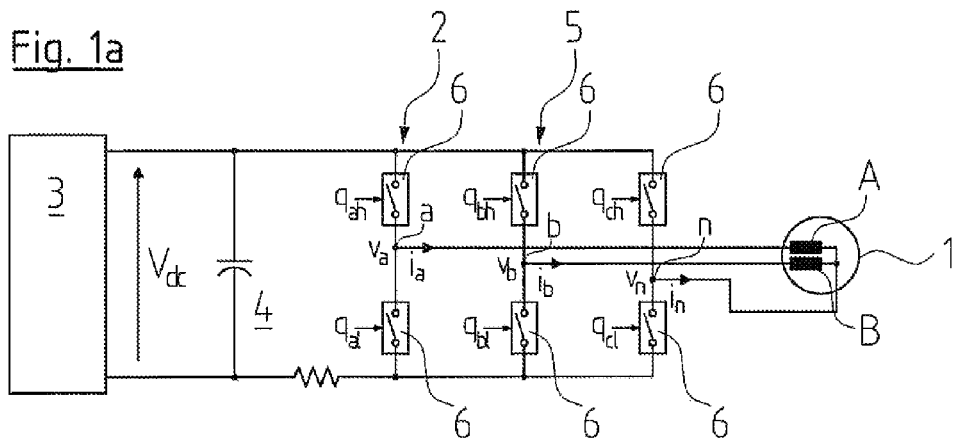
FIG. 1a to e is circuit diagrams of two-phase permanent magnet motors with inverters activating these.

FIG. 1a shows a two-phase permanent magnet motor 1 which is activated by a frequency converter 2. The frequency converter 2, in a manner known per se, consists of an input circuit 3 in the form of a rectifier, of an intermediate circuit 4 connecting thereto, as well as an inverter 5. It is to be understood that the input circuit 3 is done away with, and the frequency converter 2 then operates as a frequency producer, for applications with which a constant voltage source is available.

The inverter 5 according to FIG. 1a, comprises six electronic switches G $q_{ah}$, $q_{bh}$, $q_{ch}$ as well as $q_{al}$, $q_{bl}$, and $q_{cl}$, which in each case are connected in pairs and in series and parallel to the output of the intermediate circuit 4. The two windings A and B of the motor 1 are connected in each case between one switch pair $q_{ah}$-$q_{al}$, $q_{bh}$-$q_{bl}$, $q_{ch}$-$q_{cl}$. The outputs (phases) of the inverter 5 are indicated at a, b and n.

The winding A of the motor 1 is connected between the output a and the output n of the inverter, thus lies between the switches $q_{ah}$ and $q_{al}$ on the one hand, as well as $q_{ch}$ and $q_{cl}$ on the other hand. The winding B is connected with one end to the output b and with the other end to the output n of the inverter 5, so that both windings A and B are conductively connected to the output n of the inverter 5, and in each case a winding A and B respectively to the output a and b respectively of the inverter 5.

The combination of a three-phase inverter 5 for the activation of a two-phase permanent magnet motor 1 is particularly favorable for the reasons mentioned earlier, in particular if the inverter 5 is activated with the method according to the invention described in detail further below.

Figure 1B:
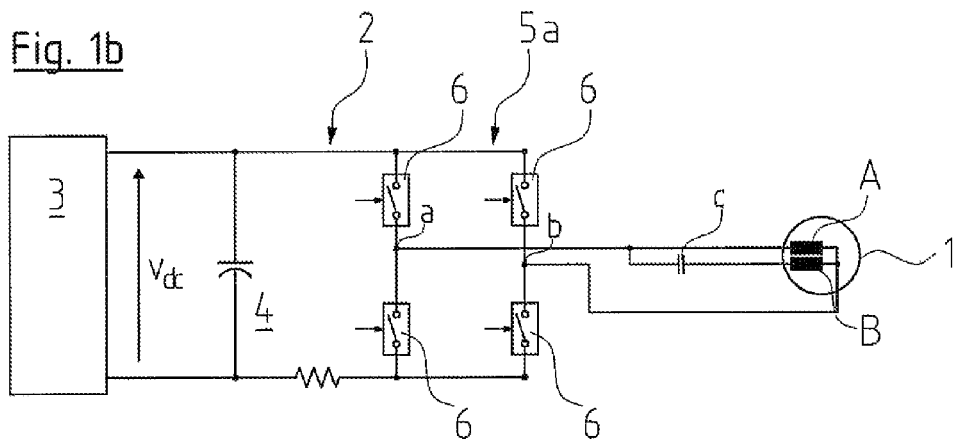

A significantly simpler activation results when the two-phase permanent magnet motor 1, as shown in FIG. 1b, is activated by a two-phase inverter 5a with, as a whole 4 switches 6, which in each case are present in pairs and in a parallel manner at the output of the intermediate circuit 4. The outputs (phases) a and b, to which in each case the windings A and B are connected in parallel, result between the switch pairs, wherein a capacitor C feeds the winding B for the purpose of phase shifting.

Figure 1C:
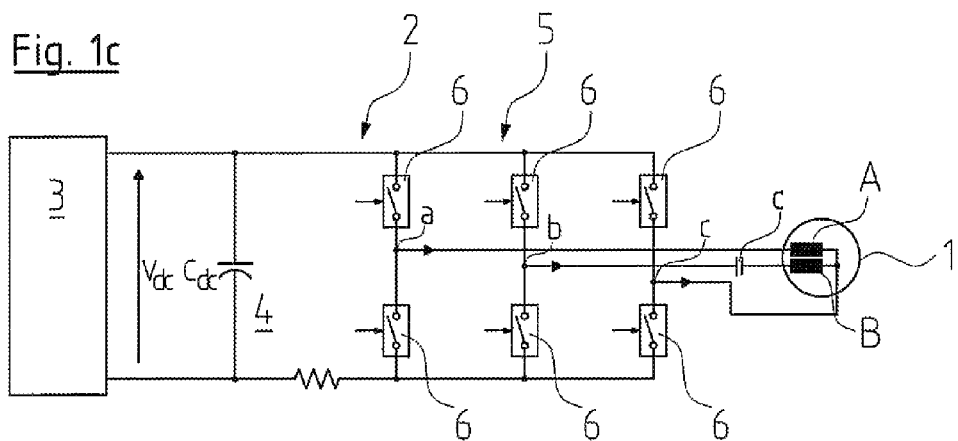

The embodiment represented by way of FIG. 1c likewise comprises an inverter 5 with six switches 6 which are in each case arranged in pairs and in series, corresponding to the embodiment according to FIG. 1a, but here too, a capacitor C feeds the winding B for the purpose of phase shifting.

Figure 1D:
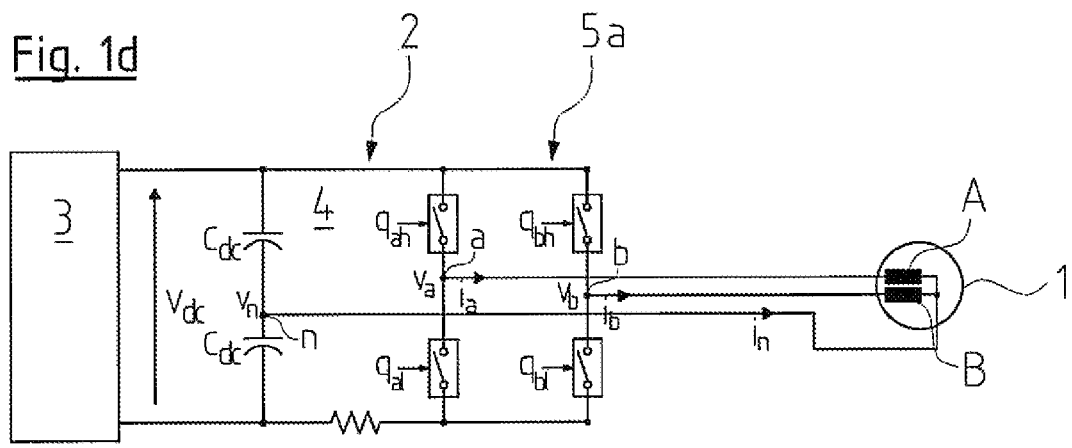

With the design according to FIG. 1d, a two-phase inverter 5a with the outputs a and b feeds the two-phase permanent magnet motor 1 with the windings A and B. However, in contrast to the embodiment according to FIG. 1b, the windings A and B are not connected parallel to the output of the frequency converter, but in each case with one end to the outputs a and b respectively, whereas the other end taps a node n which connects between the intermediate circuit capacitance formed by two capacitors.

Figure 1E:
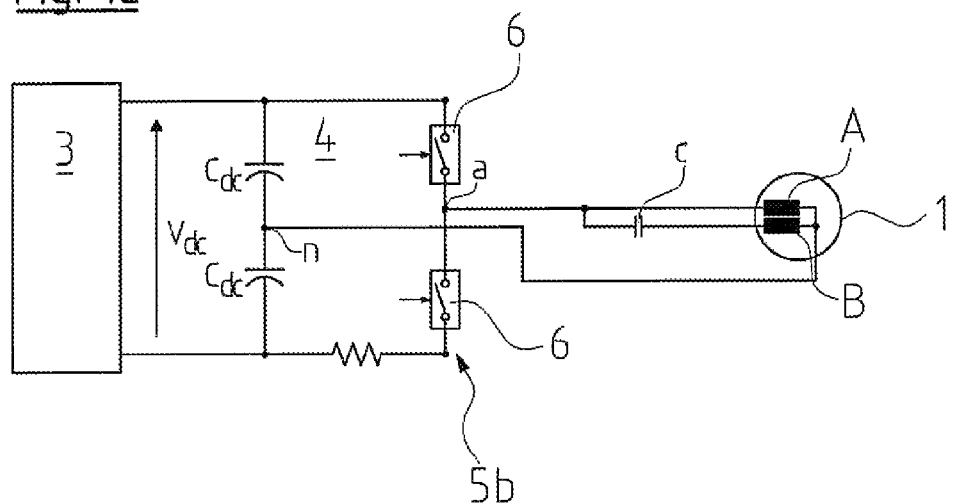

With the embodiment variant according to FIG. 1e, the two-phase permanent magnet motor 1 with its windings A and B is connected to a frequency converter 2 with a single-phase inverter 5b. The inverter 5b comprises two switches 6 which are likewise arranged as a switch pair and connect to the output of the intermediate circuit 4, and an output a is formed between them. Here too, the windings A and B on operation are affected in a phase-shifted manner by way of a capacitor C which feeds the winding B. The other end of the windings A and B, as with the embodiment according to FIG. 1d, connects in the intermediate circuit 4, and specifically thereat the node point n, which is connected in each case to the intermediate circuit potential by way of two capacitors.

For operating a two-phase motor at the three-phase inverter 5, as is represented by way of FIG. 1a, with asynchronous motors, it is counted as belonging to the state of the art to produce the set value potentials $F_a$, $F_b$ and $F_n$, which are represented in FIG. 2 and in each case shifted by 90° to one another, at the outputs a, b and n, by way of a modulated switching of the switch pairs. The set value potentials, voltages and currents which are represented in the Figures are all normalized and are represented over an angle of 360°, i.e. a complete motor rotation. The modulation of the switches 6 for producing these set value potentials $F_a$, $F_b$ and $F_n$, at the outputs of the inverter 5 are achieved in a manner known per se by way of suitable switching modulation of the switches, and this modulation is typically effected at a frequency of 18 kHz.

If, as represented by way of FIG. 1a, the motor 1 with its windings A and B is connected to the outputs a, b and n of the inverter 5, such that the winding A is connected to the output a, the winding B to the output b, and the other two sides of both windings to the output n, then the voltages $V_{an}$ and $V_{bn}$ prevailing at the windings A and B, corresponding to the potentials $F_a$, $F_b$ and $F_n$ prevailing at the outputs a, b and n at the respective point in time result, as is shown in detail in FIG. 2b. It is thus here the case of two roughly sinusoidal alternating voltages which are shifted essentially by 90° to one another. Currents in the respective outputs a, b and c of the inverter 5 which are likewise shifted by 90° to one another result on the basis of this idealized voltage course, as is represented by way of FIG. 2c.

The voltages and currents which actual result however, do not agree exactly with this idealized form according to FIG. 2b and 2c, since they are formed by pulse-width modulation of the switches. Furthermore, a switching loss arises, in particular if a switch 6 is switched with a high current throughput. For this reason, activations of the inverter 5 are provided, which avoid this.

Figure 3:
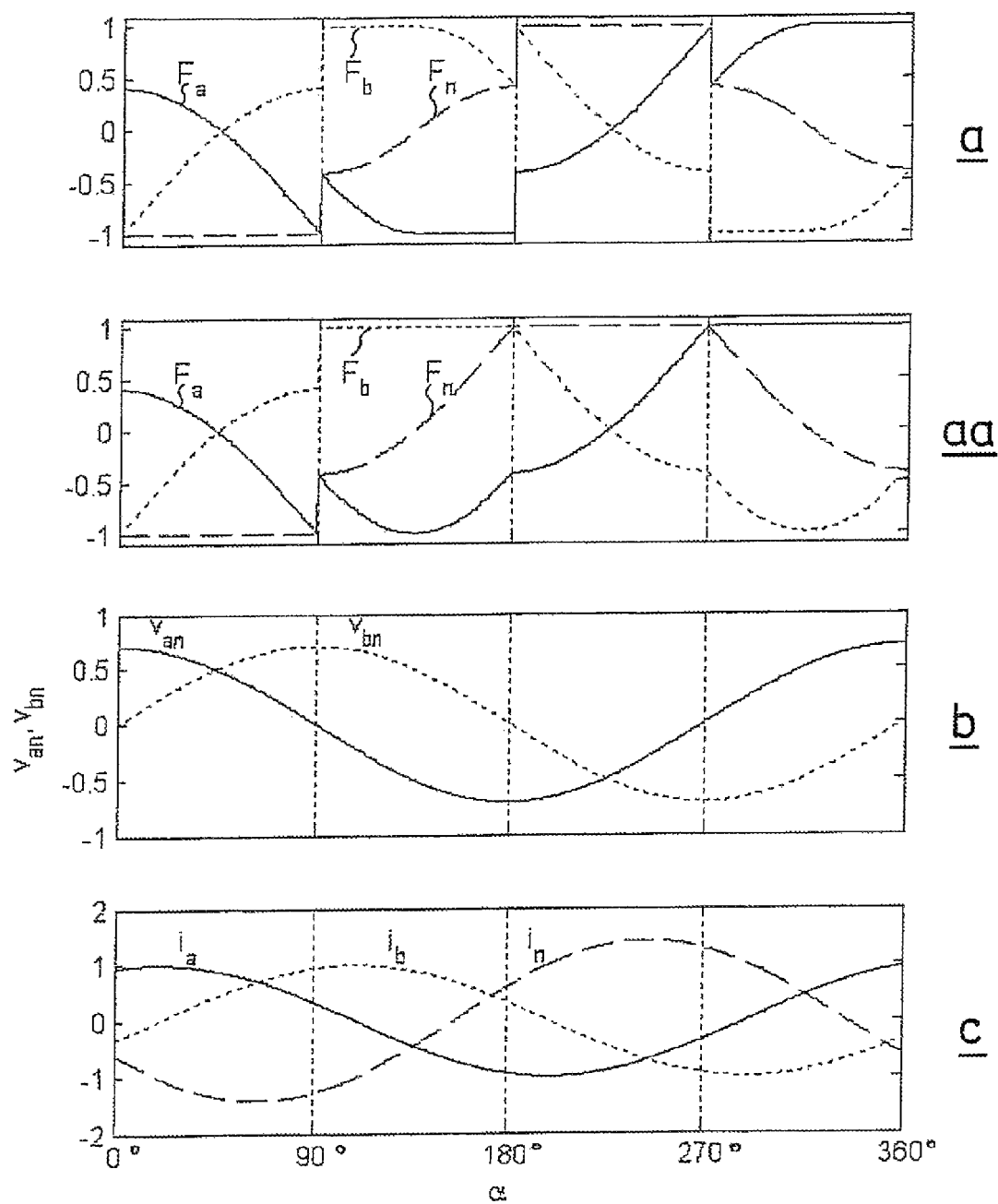

If, as shown in FIG. 3a, the potentials at the outputs a, b and n of the inverter 5 are activated in the manner as is represented in FIG. 3a and 3aa, then voltage courses and current courses result within the windings A and B, as are represented by way of FIG. 3b and 3c. These evidently do not differ from those of FIG. 2b and 2c. However, the set value potentials according to FIG. 3a as well as FIG. 3aa are defined differently. With the method according to FIG. 3a, the course of the set value potential $F_n$ is selected over a motor revolution of 360° such that during the first 90°, the set value potential $F_n$ corresponds to, in the figure, the lower of the two intermediate circuit potentials, i.e. the switch $q_{cl}$ is closed during this 90°-interval, and the other switch $q_{ch}$ is opened. This modulation is effected exclusively by way of a modulated switching of the two other switch pairs $q_{ah}$ and $q_{al}$, or $q_{bh}$ and $q_{bl}$.

A modulated switching is effected for the second 90° of the revolution, so that a set value potential course $F_n$ is present at the output n. In the third 90°-interval, again the output n of the inverter 5 is connected to one of the two intermediate circuit potentials, and specifically to that which was not connected during the first 90°. In contrast, in the fourth 90°-interval, again a modulated switching of this switch pair according to the fourth interval in FIG. 3a is effected. Also in the third interval, when an intermediate circuit potential constantly prevails at the output n of the inverter, the modulation is effected exclusively by a corresponding modulating switching of the potentials $F_a$ and $F_b$.

As FIG. 3a further shows, in the second 90° and in the fourth 90°-intervals, in each case and in an alternating manner, the potentials $F_b$ and $F_a$ are connected to the one and then to the other intermediate circuit potential, in each case for 45°, wherein the switching in the second and fourth interval is in each case effected in the reverse manner, i.e. in the second interval, firstly over approx. 45°, the one end of the winding B which is present at the exit b of the inverter 5 is connected to the one intermediate circuit potential, and for the next 45°, the one end of the winding A which is present at the output a, is connected to the other intermediate circuit potential. In the fourth interval, the connection to the intermediate circuit potential is effected in the corresponding manner, but in each case to the other intermediate potential.

As is clarified in FIG. 3a, one switch of the switch pair $q_{ch}$, $q_{cl}$ is kept constantly closed, and the other opened during the first 90°-interval, whereas the other switch is kept constantly closed and the one switch remains opened in the third 90° interval. Accordingly, in the second and fourth 90°-intervals, in each case over 45°, one switch of a switch pair which activates the output a and b of the inverter 5 is kept closed, and thereby the other switch is opened.

As FIG. 3a further shows, one current-leading switch 6 is always closed during essentially the complete 360°, which entails the considerable advantage that inasmuch as this is concerned, switching losses no longer occur. On comparing the FIG. 2a and FIG. 3a, it becomes evident that with the previously described activation method, it is always that switch which is kept closed, whose set value potential would lie closest to one of the two intermediate circuit potentials, also with a modulating switching manner. Thereby, according to FIG. 3a, a division over in each case 45° of the set value potentials $F_b$ and $F_a$ is effected.

With the activation method according to 3aa, in each case a switch pair allocated to the output n of the inverter 5, is activated in the same manner as the method previously described by way of FIG. 3a, specifically held closed during the first 90°-interval and during the third 90°-interval, wherein in the first 90°-interval, the one switch of the switch pair, and in the third 90° interval the other switch of the switch pair is kept closed and constantly opened respectively. However, one switch of the switch pair affecting the output b is constantly closed and the other opened in the second 90°-interval, and one switch of the switch pair activating the output a is kept constantly closed in the fourth 90°-interval, whilst the other switch is opened. This activation method, during a 90°-interval connects to the one, and during the remaining three 90°-intervals, to the other intermediate circuit potential.

It has been found to be advantageous, not to let the closure of the switches, as has been described by way of example by way of FIG. 3a and 3aa and will also yet be described further below by way of further embodiment examples, be effected according to the geometric winding arrangement of the motor, but shifted by an angle Y. Thereby, it is useful to switch on the switch 6 which connects the output n of the inverter 5 to the one or the other intermediate circuit potential during a rotation angle of more than 10°, later by an angle Y, and to compensate for this, to switch off the switches 6 which permanently connect the output a or the output b to one of the intermediate circuit potentials over more than 10°, later by an angle Y, in each case with respect to the activation methods according to the invention previously described by way of FIG. 3a and 3aa or other ones. The angle Y thereby is selected according to the phase shift between the voltage and current in a motor winding A or B, and as illustrated by FIG. 4c, this leads to a particularly uniform course of the current at the outputs a, b and n of the inverter 5, and thus to a very uniform moment production in the motor 1, by which means a particularly low noise emission is achieved, which is particularly advantageous for the drive of heating circulation pumps.

Figure 5:
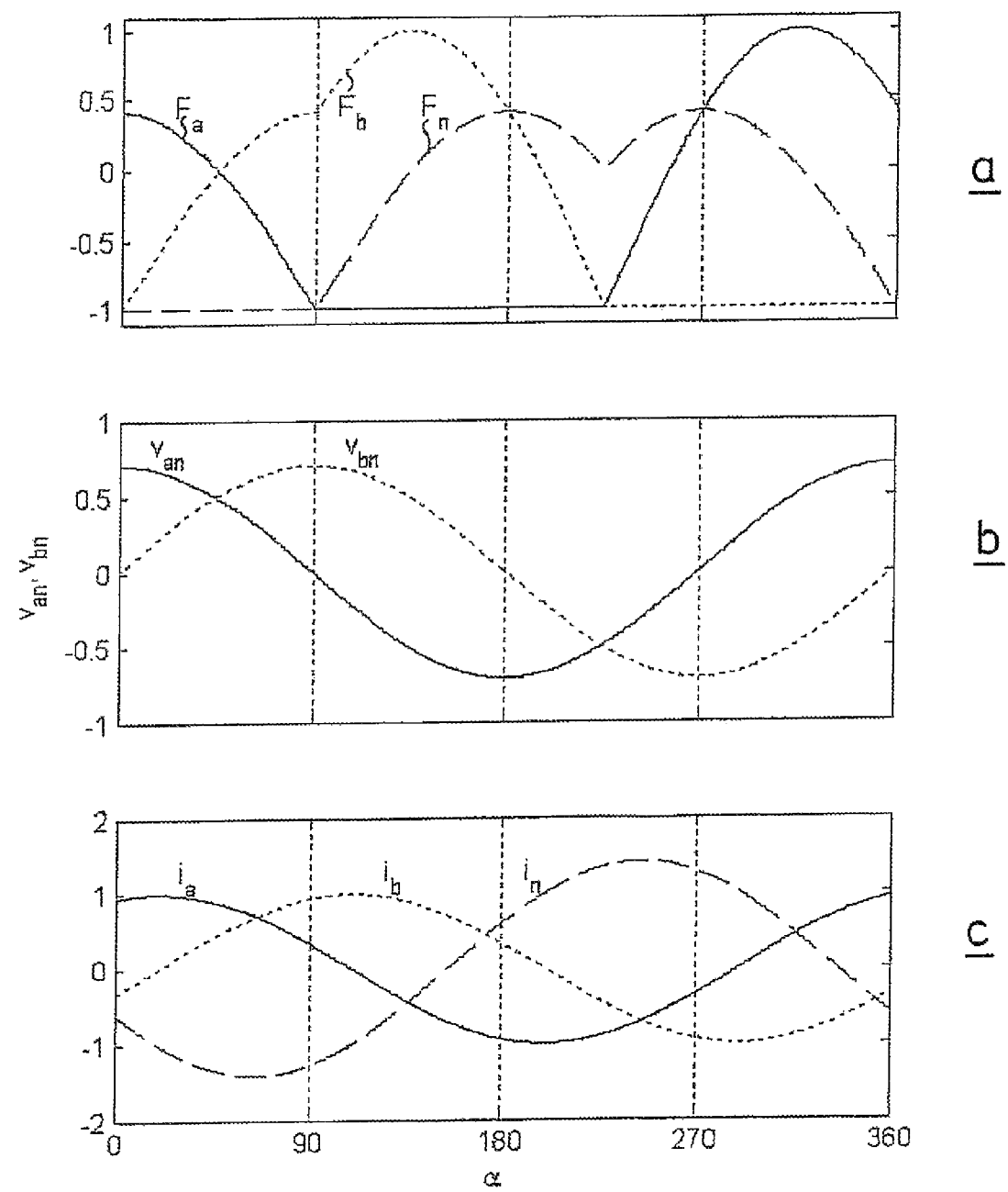

With the activation method according to FIG. 5, firstly the output n of the frequency converter is subjected to one of the two intermediate circuit potentials for a first 90° interval, then during the second 90°-interval and the subsequent 45° interval, the output a is subjected to this intermediate circuit potential, whereupon finally the output b is subjected to this intermediate circuit potential for the second half of the third 90°-interval and the fourth 90°-interval. It is to be understood that here too, when one of the outputs a, b or n of the inverter 5 is subjected to an intermediate circuit potential, the two other outputs are switched in a modulating manner, as may be recognized in FIG. 5a. A particular feature of the activation method according to FIG. 5 is that always only switches of one side are kept closed for more than 10°, and that then, resulting from this, also always only the one of the two intermediate circuit potentials is present at the respective output. This activation method too results in a voltage course and current course at the windings A and B, as is also effected with a continuous activation according to FIG. 2a, as the FIGS. 5b and 5c illustrate.

Figure 6:
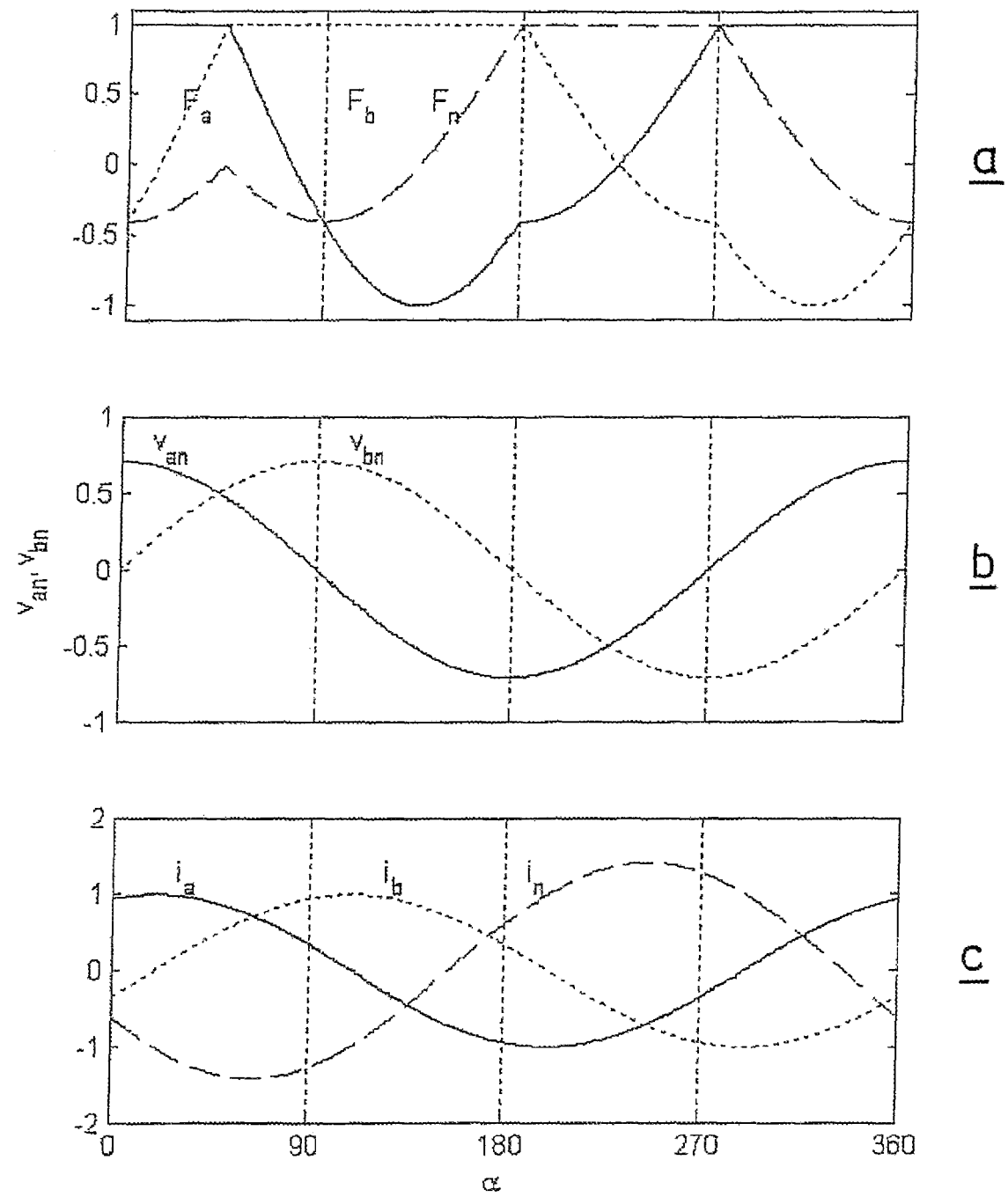

The activation method according to FIG. 6a corresponds in principle to that previously described by way of FIG. 5a, but there, a connection of the outputs of the inverter 5 to the other intermediate circuit potential is effected, and the switch positions are accordingly shifted by 180°.

Figure 7:
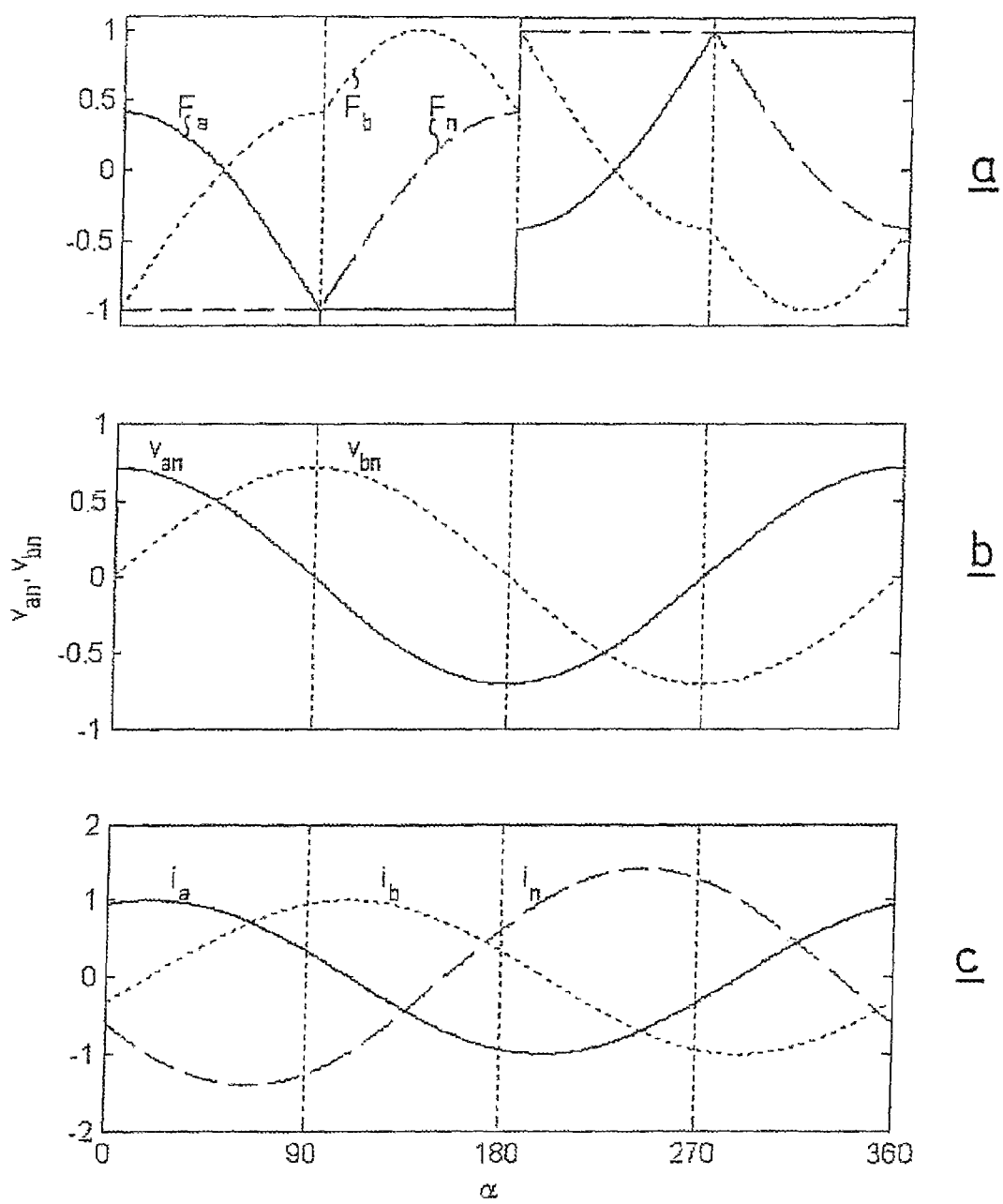

The activation method represented by way of FIG. 7a firstly keeps one of the switches affecting the output of the inverter 5 closed during a first 90°-interval, so that the output n is subjected to the one intermediate circuit potential. During the second 90°-interval, the exit b is then subjected to the same intermediate circuit potential. In the third 90°-interval, the output n then is subjected to the other intermediate circuit potential, and in the fourth 90°-interval, the output a then also to the other intermediate circuit potential. With this activation method, the switch pair controlling the output b is constantly activated in a modulating manner, whereas of the other two switch pairs which switch the output a and n, in each case one switch is closed for 90° and the other opened, or vice versa. As FIG. 7b and 7c illustrate, this activation method too produces a voltage/current course in the windings A and B, as would be also effected with a continuously modulating switching (see FIG. 2c).

Figures 8, 9:
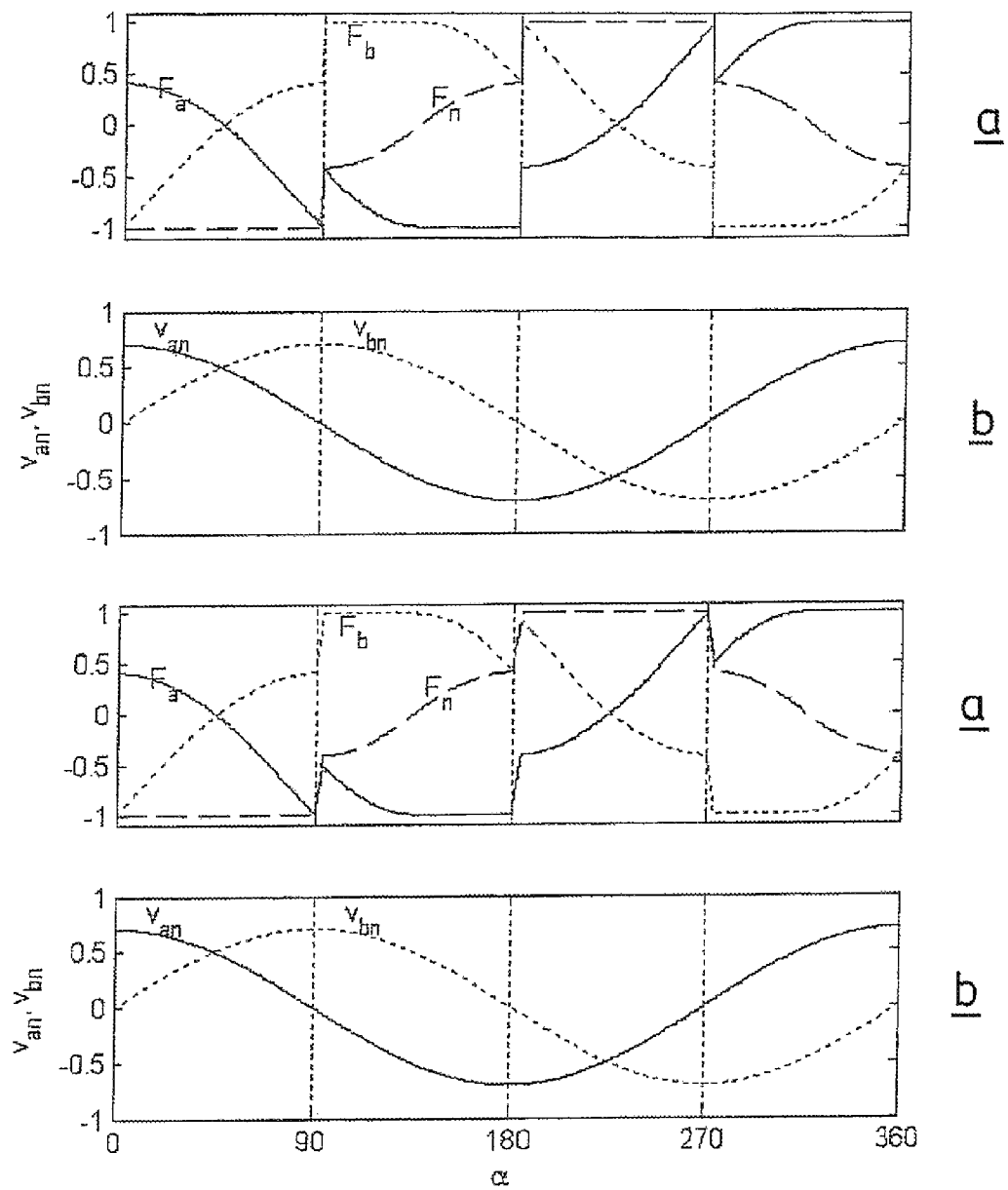

As an overview, the activation method according to FIG. 3a is represented once again in FIG. 8, and specifically in order to illustrate by way of FIG. 9a, as to how this method may be further optimized. The keeping-closed of a switch and thus the subjection of one of the outputs of the inverter to the one or other intermediate circuit potential over more than 10° is not effected in a spontaneous manner, but increasing over an angle of for example 3° to 5°, and in the same manner, the transition into the modulating switching condition is not effected in an abrupt manner, but likewise over 3° to 5°, as is represented in detail in FIG. 9a. By way of the fact that a switch, before it is kept closed over an angle of more than 10°, is firstly activated in a modulating and increasing manner, the winding connected to the corresponding output is not subjected to the full intermediate circuit potential in an abrupt manner, but in the form of a ramp which is particularly favorable with regard to the noise formation of the motor, i.e. effects a smooth running.

Figures 10, 11:
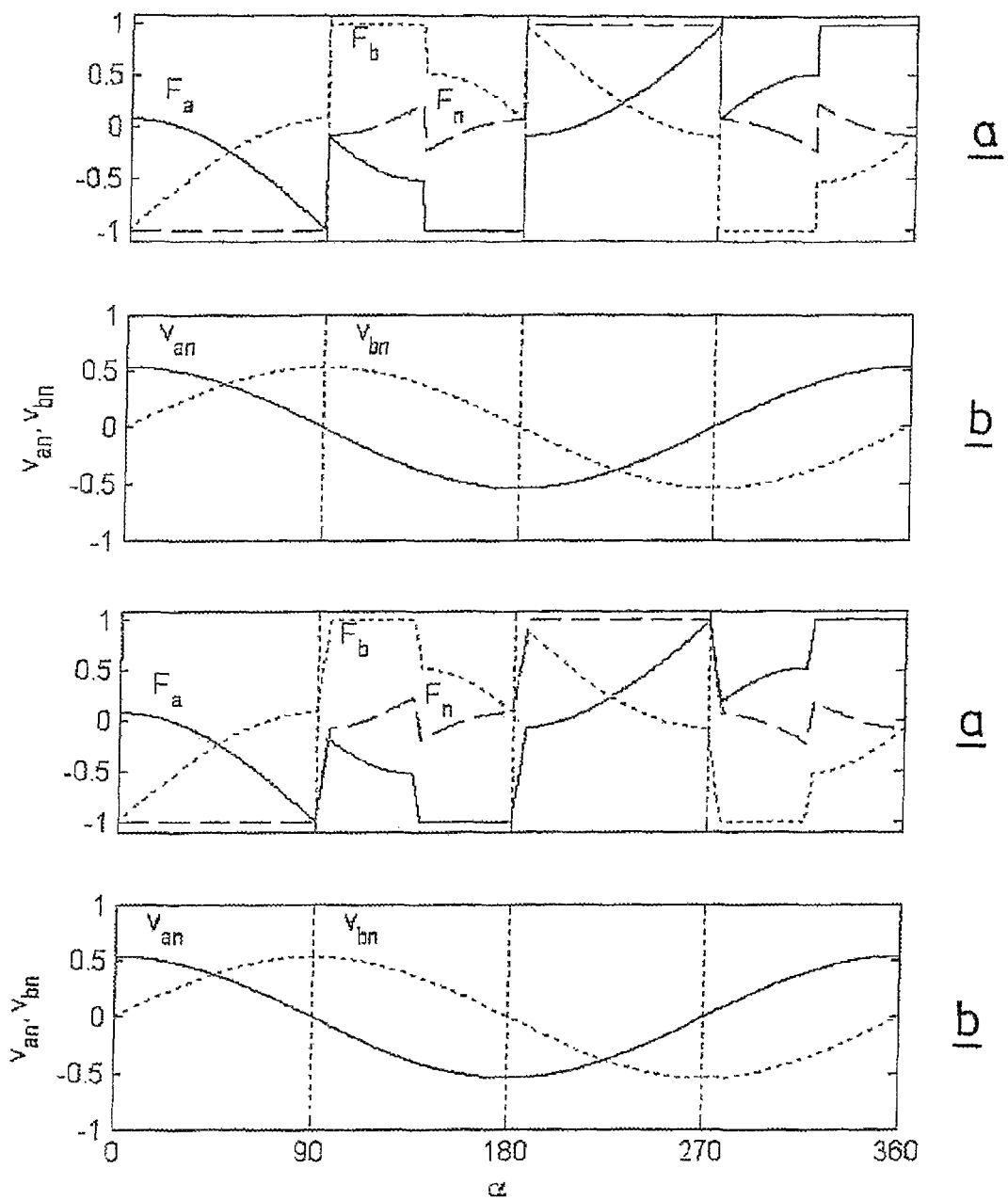

One variant of the activation according to FIG. 8a is represented according to FIG. 10a. There however, a steeper increase in the region of the transition between modulated switching and keeping-closed is effected over more than 10°. The advantage of this method is the effect that the potential courses which are produced in modulating operation by the inverter at the individual outputs essentially oscillate around zero, i.e. that the activation device is designed such that either a, where possible continuous connection, i.e. one lasting over an angle of more than 10°, to one of the two intermediate circuit potentials is effected, or however a potential course lying close to zero is produced, which arises by way of modulated switching. The lower the potential difference with the modulating switching, the smaller are the currents which flow at the same time, and the switching losses caused by way of this. If with the activation method according to FIG. 10a which is particularly favorable with regard to the switching losses, one wishes to increase the running smoothness, i.e. in particular further reduce the noise burden of the motor, then the method according to an activation according to FIG. 11a may be improved, similarly as is effected by way of the activation according to FIG. 9a for the method according to FIG. 8. Here therefore, one switches in a modulating manner over 3° to 5°, before a switch is kept closed for more than 10° or subsequently goes over into modulating operation.

Figure 12:
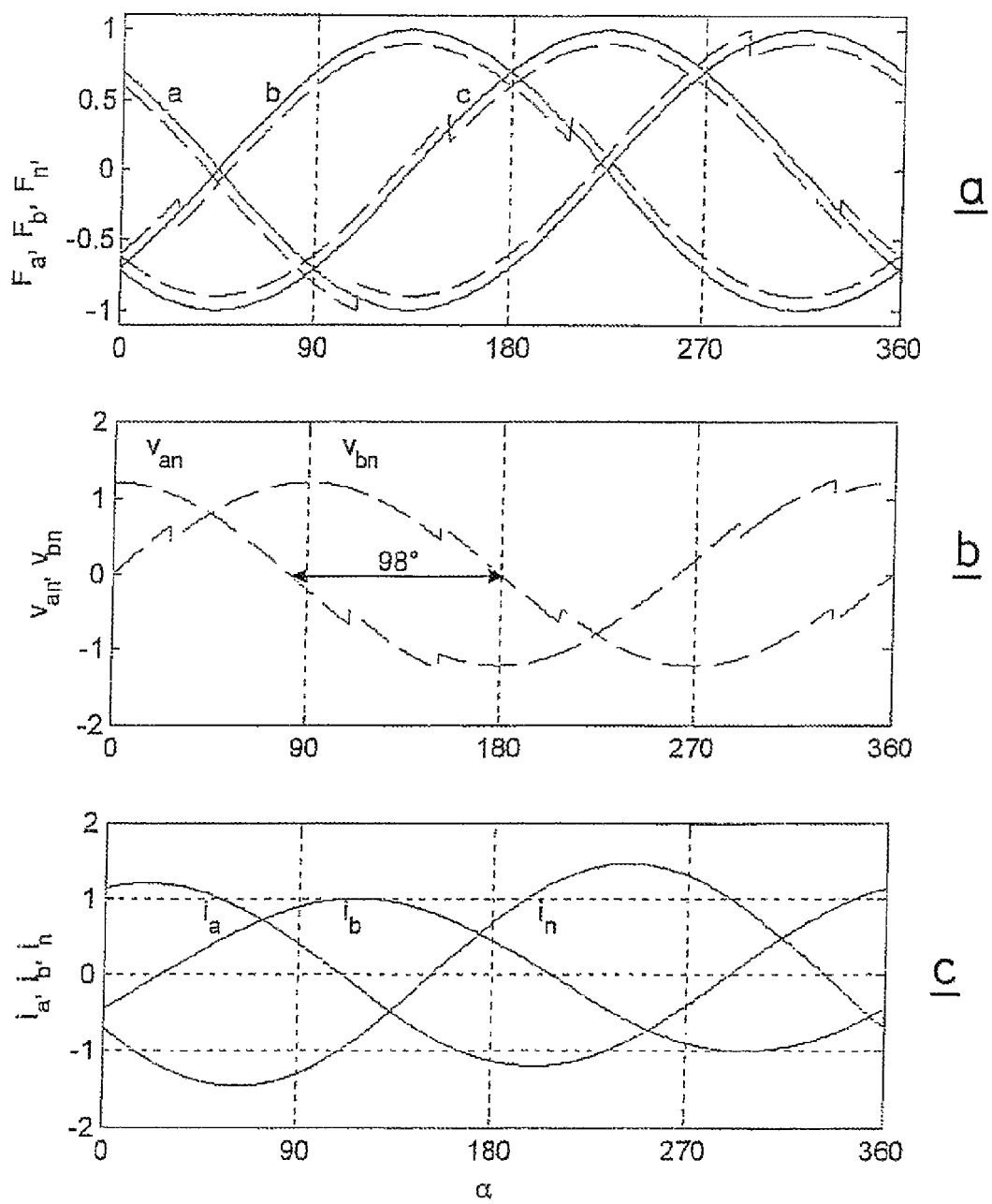
FIG. 12a shows the potentials which actually result at the three-phase output of the inverter, in comparison to the set value potentials with a conventional activation.
FIG. 12b shows the actually resulting voltages at the windings of a two-phase permanent magnet motor, with a conventional activation.
FIG. 12c shows the currents which actually arise in the phases of the inverter with a conventional activation.

An ideal set value potential course corresponding to the motor geometry, at the three outputs a, b and c of a three-phase inverter is represented by way of FIG. 12a in unbroken lines. Indeed it is not much use to set such an idealized potential course, since this would lead to the fact that the voltages prevailing at the windings A and B would not being phase shifted by 90° as desired according to the geometric arrangements, but would be phase-shifted for example by 98°. This leads to unequal currents in the three phases of the frequency converter, as is clearly evident by way of FIG. 12c. The different currents in turn leads to an moment production in the motor which would not be uniform over the motor revolution, which amongst other things may lead to the undesirable noise emissions.

In order to prevent this, and to produce an as uniform as possible sinusoidal current course which is phase shifted in each case by 90° or according to the motor geometry, at the three outputs a, b and n of the inverter and thus in the motor windings, it is useful not to let the set value potentials run phase-shifted by 90° to one another as idealized, but to arrange the set value potentials in particular of the outputs to which only one winding A or B connects, shifted by an angle deviating from 90°, here shifted by 98° with respect to the output to which both windings connect. With such a phase shifting of 98°, the potential course at the output b trails that at the output c or n by 98°, and that at the output a leads that at the output c or n by 98°. Then, as FIG. 13 shows, a voltage course at the windings A and B results, which is phase shifted by 90°, thus as usually corresponds to the geometric winding arrangement. The currents $I_a$, $I_b$ and $I_n$ which then set in are, as FIG. 13c shows, significantly more uniform in comparison to those according to FIG. 12c. Thus the amplitudes of the currents $I_a$ and $I_b$ are equally high, the amplitude of the current $I_n$ exceeds that of the currents $I_a$ and $I_b$ to a lesser extent in comparison to FIG. 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for activating a three-phase inverter with six switches, which are connected in pairs in series, the switch pairs being connected in parallel to the output of an intermediate circuit providing a DC voltage, characterized in that the switches modulate the DC voltage based on a clock having a predetermined clock period, respective ends of each winding of a two-phase permanent magnet motor being connected between the switches of two different switch pairs, and the activation of the switches being effected in a manner such that each winding is subjected to alternating voltages which are phase-shifted with respect to one another, wherein one switch of one of the switch pairs is kept continuously closed for greater than one clock period and for over a rotation angle of at least 25° while the other switch of the one switch pair is continuously opened, while the desired voltage course at each winding is produced by way of modulation of the two other switch pairs.

2. A method according to claim 1, characterized in that the windings are subjected to essentially sinusoidal alternating voltages which are phase shifted by about 90°.

3. A method according to claim 1, characterized in that the rotation angle during which the one switch is kept closed, is predefined and is dependent on the current angle of the supply voltage of the stator.

4. A method according to claim 1, characterized in that one of the switches is kept closed, which leads a set value potential lying closest to one of the two intermediate circuit potentials prevailing at the output of the intermediate circuit.

5. A method according to claim 1, characterized in that the inverter may be activated for producing alternating voltages of a lower and higher voltage and/or frequency, and wherein a switch of one switch pair, over a rotation angle of at least 25°, is kept closed and the other opened, whilst the desired voltage course at the windings is produced by way of modulating the two other switch pairs, and specifically only on producing alternating voltages of a high voltage.

6. A method according to claim 1, characterized in that it is always the switch through which the largest current flows which is kept closed.

7. A method according to claim 1, characterized in that one switch is kept continuously closed over a rotation angle of about 90°.

8. A method according to claim 1, characterized in that a switch of the switch pair, between which the winding ends of both windings are connected, is firstly kept continuously closed over a rotation angle of about 90° then is switched in a modulating manner over about 90°, whereupon the other switch of this switch pair is kept closed over about 90° and then switched in a modulating manner over about 90°.

9. A method according to claim 8, characterized in that in the 90°-intervals, in which no switch of the switch pair between which the winding ends of both windings are connected, is kept continuously closed, a switch of one of the two other switch pairs is kept continuously closed, and specifically during the first 90° interval a switch of the one, and during the next 90°-interval, a switch of the other switch pair.

10. A method according to claim 8, characterized in that in the 90°-intervals, in which no switch of the switch pair between which the winding ends of both windings are connected, is kept closed, in each case one switch of the two other switch pairs is kept closed, and specifically a switch of the one switch pair for the first 45° of the interval and a switch of the other switch pair for the second 45° of the interval.

11. A method according to claim 1, characterized in that during a 360°-rotation, only those switches are kept continuously closed, which create the lead connection to only one of the two intermediate circuit potentials.

12. A method according to claim 1, characterized in that during a 360°-rotation the switches are continuously closed such that over a rotation angle of about 180°, one lead connection to one, and subsequently to the other of the two intermediate circuit potentials is created in an alternating manner.

13. A method according to claim 1, characterized in that the discontinuous switch activation, for a predefined angle of from 1 to 15 switch periods of the clock before a potential change, is replaced by a continuous switch activation.

14. A method according to claim 1, characterized in that the control is effected such that the currents of the two motor phases run shifted to one another by a predefined angle, preferably adapted to the geometric angle of the phases.

15. A method according to claim 1, characterized in that the phase angle between the set value potentials of the common phase and the other phases have a value deviating by at least 90°.

16. A method according to claim 1, characterized in that the deviation of the phase angle between the set value potentials of the common phase and the other phases is between 3° and 15°.

17. A method according to claim 1, characterized in that the switch which connects both phase windings over a rotation angle of 10° to 100° to an intermediate circuit potential, is closed by an angle Y later than the switches which connect only one phase winding over an rotation angle of 10° to 100° to an intermediate circuit potential, and wherein the latter switches are switched in a modulating manner by an angle Y later.

18. A method according to claim 17, characterized in that the angle Y is equal to the angle of the phase shift between the voltage and the current in a motor phase.

19. The method of claim 1, characterized in that the one switch of the switch pair is kept continuously closed over a rotation angle of between 35° and 100° while the other switch of the one switch pair is continuously opened.

* * * * *